US008208918B2

(12) United States Patent
Rui et al.

(10) Patent No.: US 8,208,918 B2
(45) Date of Patent: Jun. 26, 2012

(54) SYSTEM AND METHOD FOR ACCOMPLISHING MOBILE MANAGEMENT OF FIXED NETWORK SWITCHING NODE

(75) Inventors: Bailin Rui, Shenzhen (CN); Qin Yin, Shenzhen (CN); Sanxing Ren, Shenzhen (CN)

(73) Assignee: ZTE Corporation, Guangdong (CN)

( * ) Notice: Subject to any disclaimer, the term of this patent is extended or adjusted under 35 U.S.C. 154(b) by 908 days.

(21) Appl. No.: 11/568,491

(22) PCT Filed: Mar. 30, 2005

(86) PCT No.: PCT/CN2005/000414
§ 371 (c)(1),
(2), (4) Date: Dec. 3, 2007

(87) PCT Pub. No.: WO2005/107302
PCT Pub. Date: Nov. 10, 2005

(65) Prior Publication Data
US 2008/0242295 A1 Oct. 2, 2008

(30) Foreign Application Priority Data

Apr. 28, 2004 (CN) .......................... 2004 1 0037328

(51) Int. Cl.
*H04W 4/00* (2009.01)
(52) U.S. Cl. .................. 455/432.1; 455/432.3; 455/433; 455/434; 455/435.1; 455/435.2; 455/436; 370/310.2; 370/328; 370/331
(58) Field of Classification Search ............... 455/432.1, 455/432.3, 433, 434, 435.1, 435.2, 436; 370/310.2, 370/328, 331
See application file for complete search history.

(56) References Cited

U.S. PATENT DOCUMENTS 5,592,541 A   1/1997   Fleischer, III et al.
(Continued)

FOREIGN PATENT DOCUMENTS

CN   1339926 A   3/2002
(Continued)

OTHER PUBLICATIONS

Supplementary EP Search Report for EP 05737858 dated Jul. 28, 2009.

*Primary Examiner* — Steve D Agosta
(74) *Attorney, Agent, or Firm* — Lowe Hauptman Ham & Berner

(57) ABSTRACT

The present invention discloses a system and method for realizing mobile management of fixed network switching node. The method comprises the following steps: setting a subscriber attribute register (SAR) in the fixed network, connecting the subscriber attribute register to each switching node via signaling link; distributing an unique logic number and physical number corresponding to the location for the subscriber, storing the subscriber attribute and location information of the switching node where the subscriber locates in the home SAR collectively, when the subscriber location changes, insetting the attribute data of the subscriber into the new location, deleting the data of the former location, and updating the location information of the subscriber in the SAR; when a call is activated, the calling office requests routing to the SAR, and SAR searching the called physical number and returning it to the calling office; when the subscriber attribute data changes, modifying the corresponding data in the SAR firstly, then insetting the data into the switching node where the subscriber locates, thus completing synchronous update of data. Through the present invention, the fixed network may have a function of a mobile network, and at the same time, the subscriber attribute data is managed collectively, thus make it easy to maintain and take full advantage of number resources.

20 Claims, 5 Drawing Sheets

U.S. PATENT DOCUMENTS

| | | | |
|---|---|---|---|
| 5,825,864 A | 10/1998 | McGraw et al. | |
| 6,181,938 B1 * | 1/2001 | Salmela et al. | 455/433 |
| 6,941,139 B1 * | 9/2005 | Shupe et al. | 455/432.3 |
| 7,454,200 B2 * | 11/2008 | Cai et al. | 455/419 |
| 2003/0069840 A1 * | 4/2003 | Ung | 705/39 |
| 2004/0158618 A1 * | 8/2004 | Shaw | 709/217 |
| 2005/0202810 A1 * | 9/2005 | LaPallo | 455/426.1 |

FOREIGN PATENT DOCUMENTS

| | | |
|---|---|---|
| CN | 1474583 A | 2/2004 |
| GB | 2254755 A | 10/1992 |
| WO | 97/36451 A1 | 10/1997 |
| WO | 98/21911 A1 | 5/1998 |
| WO | 03/058933 A1 | 7/2003 |

* cited by examiner

SYSTEM AND METHOD FOR ACCOMPLISHING MOBILE MANAGEMENT OF FIXED NETWORK SWITCHING NODE

RELATED APPLICATIONS

The present application is a National Phase entry of International Application Number PCT/CN2005/000414, filed Mar. 30, 2005, which claims priority from, Chinese Application Number 200410037328.7, filed Apr. 28, 2004, the disclosures of which are hereby incorporated by reference herein in their entirety.

TECHNICAL FIELD OF THE INVENTION

The present invention relates to switching technique of fixed network switching network, particularly, relates to a system and method for realizing mobile management of fixed network switching node.

BACKGROUND OF THE INVENTION

With the forming of multiple operators competition situation, the competition among operators is gradually developing from the low level for price to the high level for improving QoS and providing personal services. Currently, the developing speed of mobile communication and data communication greatly exceeds that of the fixed communication. Being the main provider of fixed telephone, it is a crucial matter for the operator to explore how to employ the advantages of fixed network, combine with mobile communication and data communication, provide personal services for the subscribers, meet various requirements of the subscribers, improve operation profits, and realize the increase of quantity and profits. In the future network construction, on the one hand, it is necessary to enable the subscribers enjoy the convenience of mobility in relatively fixed environment, and avoid the fatal shortcoming of "fixed" of the fixed terminal, On the other hand, it is necessary to enable the subscriber enjoy high-quality voice and data services in relatively fixed environment. In other words, it is necessary to provide a method for realizing mobile management of fixed network switching node, which can fully exert the advantages of the fixed network, and shunt part of the traffic of the mobile operator to the fixed switching network.

With the rapid development of PHS service, the fixed network operator operates two networks simultaneously to serve the subscribers in a same regional network. How to converge the advantages of two networks, and dig out more services to meet the subscribers' requirements are key point in the development of the fixed network in a very long period of time. The realization of mobile management of switch may become the foundation for the network convergence, based on which, the services can be converged and more new services can be developed.

With the development of society, the space of people's life and work is gradually enlarged, not only limited to a fixed environment. In order to improve the QoS, and to meet the subscribers' requirements, operators of fixed network have proposed some services concerning to these requirements, such as Number Portability (NP), mixed putting-out number, etc., but these services can only realize the mobility of the subscriber number, but not the simultaneous mobility of the number and the subscriber attribute.

Currently, the number management of the fixed network employs the form of extensive management. With the development of services, number is a public and private resource which is very valuable. How to realize the mobile management of the switching node, make the utilization of number resources more collective, avoid the separate management of switching nodes, and fully explore the market value of the number resources is an important problem to be solved for developing the telecommunication market.

SUMMARY OF THE INVENTION

The technical problem to be solved in the present invention is to provide a method for realizing mobile management of fixed network switching node, enabling the subscriber number separate from the terminal, and the number move with the subscriber attribute according to the move of the subscriber, and at the same time, realizing the centralized management and synchronous update of subscriber data. The present invention also provides a system for realizing the above method.

In order to solve the above technical problem, the present invention provides a method for realizing mobile management of fixed network switching node, which includes the following steps of:

(a) setting a subscriber attribute register in the fixed network, the subscriber attribute register can communicate with switching nodes in its service area of the fixed network; and (b) attributing an unique logic number and a physical number corresponding to the subscriber location to the subscriber, storing the two numbers in the switching node where the subscriber currently locates together with other attribute data of the subscriber, and storing the subscriber attribute data and location information in the subscriber attribute register to which the subscriber belongs;

(c) when the subscriber location changes, deleting the subscriber attribute data of the former location, and insetting the subscriber attribute data into a new location, bundling the new physical number with the logical number of the subscriber, and updating the subscriber location information in the subscriber attribute register;

(d) when a call is activated, the calling switching node requesting the called physical number to the subscriber attribute register, the subscriber attribute register searching and finding the called physical number according to the location information and returning it to the calling switching node, then the calling switching node connecting to the switching node where the called locates according to the called physical number;

Further, the above method has the following feature: in said step (b), the subscriber location information is the information of the switching node where the subscriber locates; in said step (c), the subscriber attribute register updates the switching node where the subscriber locates into a switching node of a new location; in said step (d), the subscriber attribute register obtains the called physical number by inquiring the switching node where the called locates.

Further, the above method has the following feature: in said step (b), the subscriber location information includes the information of the switching node where the subscriber locates and the information of the physical number; in said step (c), the subscriber attribute register updates the switching node where the subscriber locates and the physical number into a switching node of a new location and a new physical number; in said step (d), the subscriber attribute register searches the called physical number directly in local.

Further, the above method has the following feature: step (e) is further included, when the subscriber service or contract data changes, the subscriber attribute register modifies corresponding subscriber data in the database firstly, then notifies the subscriber-located switching node to inset the modified subscriber attribute data, thereby accomplish the synchronous update of data.

Further, the above method has the following feature: said subscriber attribute register and said switching node communicate each other via MAP protocol.

Further, the above method has the following feature: said logic number is composed of telephone number and region number of the subscriber used on the Public Switched Telephone Network, said physical number uses internal coding of the Public Switched Telephone Network.

Further, the above method has the following feature: the subscriber attribute register further stores subscriber-related international mobile subscriber identification code and mobile subscriber ISDN number, in which, said international mobile subscriber identification code is composed of the subscriber physical number or logic number, said mobile subscriber ISDN number is composed of the subscriber logic number, national code and regional code.

Further, the above method has the following feature: in said step (c), when the subscriber moves in the node, the subscriber or operator moves the subscriber attribute data from the former location to the record of current terminal location, and establishes corresponding relationship between the subscriber logic number and the new physical number.

Further, the above method has the following feature: in said step (c), when the subscriber moves across nodes, the subscriber or operator operates to make the switching node where the subscriber currently locates notify the subscriber attribute register of the change of subscriber location; after the authorization of the subscriber attribute register, notify the switching node where the subscriber original locates to delete the subscriber attribute data; after confirmation, notify the switching node where the subscriber currently locates to inset the subscriber attribute data, and the current switching node bundles the new subscriber physical number and logic number; said subscriber attribute register updates the subscriber location information after obtaining conformation of said switching node where the subscriber currently located.

Further, the above method has the following feature: each switching node visits location register number, according which, said subscriber attribute register identifies the location information of the switching node where the subscriber locates and searches for address.

Further, the above method has the following feature: in said step (e), when the operator changes the subscriber service or contract data, a modification notification is sent out to the subscriber attribute register via account system, and subscriber parameter is provided; when the subscriber modifies additional service, the switching node where the subscriber locates sends out a modification notification to the subscriber attribute register, carrying data related to the additional service.

Further, the above method has the following feature: the following step is further included: service control function module of the switching node sends out a request of subscriber information to the subscriber attribute register; after receiving the request, the subscriber attribute register inquires the switching node where the subscriber locates, and returns result to the service control function module initiating the inquiry.

Further, the above method has the following feature: the following steps are further included:

when traffic service position of said switching node needs to modify the subscriber attribute data in business group, it firstly sends out a request for modifying the subscriber attribute data to home subscriber attribute register via the switching node;

the subscriber attribute register judges whether the subscriber and the traffic service position belong to a same business group, if so, perform the next step, otherwise, refuse the request;

the subscriber attribute register modifies local subscriber attribute data, returns a conformation message, and sends out a request of insetting subscriber attribute data to the subscriber-located switching node;

after finishing the insetting operation, the subscriber-located switching node returns a conformation message to the subscriber attribute register.

In order to solve the above technical problem, the present invention provides a system for realizing mobile management of fixed network switching node, which includes multiple switch nodes, and is characterized in further including at least a subscriber attribute register connecting with switching nodes via signaling link, in which:

Said switching node includes: a database, for storing physical number, logic number and other attribute data of a current subscriber in record corresponding to location of the subscriber; a communication unit, for notifying said subscriber attribute register when the subscriber location is updated or subscriber data is modified; a data process unit, for updating subscriber attribute data in local database according to the notification of the subscriber attribute register; and a routing unit, for sending out a route request to home subscriber attribute register when calling, and connecting to the switch of the called according to the physical number of the called subscriber in the routing returned;

The subscriber attribute register includes: a database, for collectively storing attribute data and location data of all describers in domination area; a data process unit, for modifying location data and attribute data of corresponding subscriber in local database after receiving the notification of updating location or modifying data; a communication unit, for notifying related switching node to delete or inset the modified subscriber attribute data; and a routing unit, for receiving the routing request of the calling switching node, searching and returning the called physical number to the calling switching node.

Further, the above system has the following feature: both said switching node and said communication unit of the subscriber attribute register have modules which support mobile application part of No. 7 signaling and have corresponding coding/decoding function.

Further, the above system has the following feature: said subscriber attribute register employs the home location register equipment operating on the existing network.

Further, the above system has the following feature: said switching node further includes a service control function module, for sending subscriber information request to the subscriber attribute register and receiving the result; said subscriber attribute register further includes inquiry unit, for inquiring the subscriber-located switching node after receiving said subscriber information request, and returning the inquiry result to the service control function module.

Further, the above system has the following feature: the switching node connects with the traffic service position, the traffic service position is used for modifying the subscriber attribute data in located business group, and sending request of modifying the subscriber attribute data to the subscriber attribute register via the switching node; said subscriber attribute register further includes a business group process unit, for judging whether the subscriber and said traffic service position belong to a same business group, if so, modifying the subscriber information of the local database, and notifying the subscriber-located switching node to inset the new subscriber attribute data via the communication unit, otherwise, refusing the request.

The method of the present invention for realizing mobile management of fixed network switching node has the following advantages:

Through managing the fixed network subscriber collectively, the subscriber has a unique identification, making the subscriber has a feature of a mobile network subscriber, and the subscriber number and subscriber attribute moving together with the subscriber is realized, which is helpful to the development of new services and maintenance of subscriber data;

Through fully utilizing number resources, number customization services can be performed, such as unique number service, number-taking service, mixed number-putting-out service, wide area Centrex service, number bundling service, personal number service, and luck number, etc;

Fixed network and mobile network convergence problem is resolved, convergence problem of PSTN and NGN in fixed network is resolved, thus the cost of management and operation is saved, the number resources can be shared, and more services can be explored by utilizing network convergence, such as mixed number-putting-out service, mixed Centrex service, two machines with one number service, etc, thereby enable the fixed telephone network enjoy the advantages of the mobile network;

The method of the present invention provides a foundation for the operator to carry out 3G (third generation) service, that is, the subscriber can enjoy the 3G service without modifying number, thus new subscribers will be attracted to join in while keeping the original custom resources, thereby the operation profit will be improved.

By employing the present invention, the mobile function of PSTN switch can be realized without changing the network structure, subscriber number, and the hardwires of the existing switch equipment, the only required thing is to update software version of PSTN network switch and increase equipments such as the subscriber attribute register SAR (for example, HLR), thereby the shortcomings of the fixed and unmovable PSTN network are effectively overcome.

When NGN is constructed, SAR can also be a network element of NGN, SAR and NGN interact with each other by employing the method of the present invention, thereby the subscribers of NGN can have the mobile feature.

PREFERRED EMBODIMENT OF THE INVENTION

Next, the method for realizing mobile management of fixed network switch node will be described in detail in combination with appended drawings.

The following embodiment describes the switch in PSTN network, but the present invention is also applicable to the mobile management of fixed network switching node, such as Soft switch in NGN network.

Figure 1:
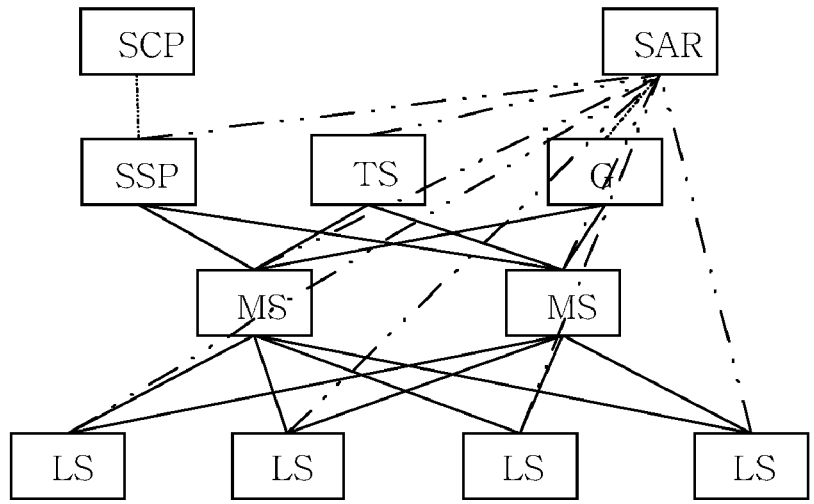
FIG. 1 is system networking diagram according to embodiment of present invention.

FIG. 1 is the system networking diagram for realizing mobile management of switch in PSTN according to the embodiment of present invention, in which, real line refers to overlay link, dashed line refers to signaling link. As shown in FIG. 1, in this embodiment, a subscriber attribute register equipment SAR is added in PSTN network. The connecting relationship between local switch LS, multiplex switch MS, trunk switch TS, gateway GW, and service switch point SSP remains unchanged, but signaling link with SAR needs to be added.

The subscriber attribute register (SAR) is a core equipment for realizing mobile management according to the present invention, for managing the subscriber attribute information (such as contract data, service data, etc) of the PSTN network switch in administration region collectively. SAR can be acquired by two forms, one is new construction, i.e. adding SAR in PSTN network; one is utilizing HLR equipment running on the existing network in order to save investment or to comply with the requirement for future network construction, such as the HLR of PHS or HLR of mobile network.

Figure 2:
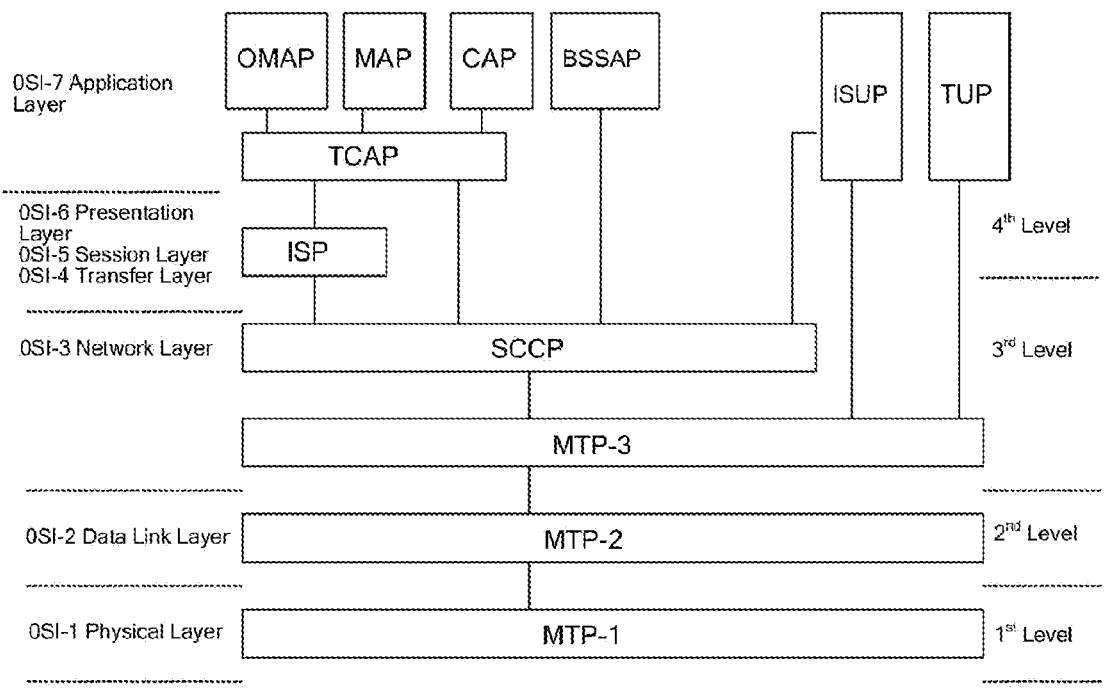
FIG. 2 is system structure diagram of No. 7 signaling.

In this embodiment, SAR and switch realize automatic data synchronization by employing MAP which is commonly employed in existing mobile network, but other extension protocols can also be employed. The SAR and switch need to be set with functions supporting mobile application part (MAP) and corresponding coding/decoding in No. 7 signaling, as shown in FIG. 2, mainly includes the following function modules: MTP (message transfer part), SCCP (signaling connection control part), TUP (telephone user part), ISUP (ISDN user part), TCAP (traffic process ability application part), BSSAP (base station subsystem application part). MTP is further divided into MTP1, MTP2, MTP3, which correspond to the first, second and third layer in OSI seven layer protocol. TUP belongs to the forth level function of No. 7 signaling, mainly for realizing establishment and release of related call in PSTN, and at the same time for supporting partial subscriber additional services. ISUP also belongs to the forth level function of No. 7 signaling, for supporting voice and non-voice services in ISDN. TCAP is a middle layer located between service layer and SCCP, it belongs to the seventh layer in OSI seven layer protocol, TCAP subscriber currently includes three parts, i.e. OMAP, MAP, and CAP, TCAP has stipulations and function of application layer, but not the stipulations and function of 4~6th layers. Therefore, all services included in TCAP employ the SCCP supporting function directly.

In order to overcome the fatal shortcoming of "fixed" of the fixed network, and realize mobile management of switch, it is necessary to adjust the data of the switch, and store the subscriber attribute data into SAR for collective manage.

In this embodiment, two numbers are configured for the switch subscriber: one is external number, a number for displaying, dialing, accounting and paying externally, which is closely related to the subscriber attribute and is the unique identification distinguishing the subscriber from others, i.e., a logic number; the other number is internal number, which corresponds to the port of switch subscriber line one to one, and relates to the route and location, i.e., a physical number. In this invention, the port of switch subscriber line is similar to the wireless channel of mobile network, which is only a channel for the subscriber accessing to switch, and can be commonly shared, the number (logic number) is the actually effective personal resource of the subscriber. The physical number and the logic number are bundled in the switch, when the subscriber roams to another location and re-registers, the new physical number of the subscriber is bundled with the logic number through location updating operation. In this embodiment, the logic number employs the number currently used by the subscriber, composed of regional code and telephone number; the physical number employs internal coding of PSTN network, such as the internal coding of subscriber line, but it can also employ other coding forms.

The switch mainly includes the following mobile management-related functional modules: a database, for storing the physical number, logic number and other attribute data of the subscriber into the record corresponding to the subscriber location; a communication unit, for notifying the home SAR when the subscriber location is updated or subscriber data is modified; a routing unit, for sending routing request to the home SAR when a call is activated, and connecting to the switch of the called according to the physical number of the called subscriber in the routing returned; a data process unit, for updating the attribute data of corresponding subscriber in local database according to the notification of SAR; and a service control functional module, for sending a request of subscriber information to the subscriber attribute register and receiving the result returned. The local database of the switch is similar to the visited location register (VLR) of mobile network, each switch office has a VLR number, representing location information of the switch office, and SAR identifies the subscriber location information and searches for address according to the VLR number.

SAR is responsible for storing and managing the subscriber attribute data of PSTN switch, mainly including the following functional modules related to the mobile management: a database, for storing attribute data (including contract data, service data etc.) and location data of all the subscribers in domination area collectively, it can either include the information of the switch where the subscriber locates or include both the information of the switch office and the physical number information; a data process unit, for modifying the location and attribute data of corresponding subscriber in local database after receiving the notification of updating location or modifying data; a communication unit, for notifying related switch to delete or inset the modified data; a routing unit, for receiving the routing request of the calling switch, and returning the routing information including the called physical number to the calling switch; an inquiry unit, for inquiring the switch where the subscriber locates after receiving the subscriber information request, and returning the result to the service control functional module of the switch; and a business group process unit, for judging whether the subscriber and the traffic service position belong to a same business group, if so, modifying the subscriber information in local database, and notifying the switch node of the subscriber to inset the new subscriber attribute data via the communication unit, otherwise, refusing the request.

There are two numbers related to the subscriber stored in the local database of SAR: international mobile subscriber identification (IMSI) and mobile subscriber ISDN (MSISDN); the IMSI can be coded according to local situations, and is an indispensable parameter for the mutual interaction between SAR and switching node; the MSISDN is composed of the subscriber logic number and national code as well as regional code. Thus, the fixed subscriber can use this number when he moves to any location in the country.

The synchronous update of the subscriber attribute data and the operation of routing request are carried out between the switch (including endpoint switch, multiplex switch, trunk switch, gateway switch, service switching node with fixed user etc.) and SAR. The switch where the subscriber locates stores the subscriber attribute data in the local database according to the original way, but with adding an interface for communicating with SAR.

With the above configurations, the roaming of fixed network subscriber, the synchronous update of subscriber attribute data between SAR and switch, the search and inquiry of subscriber information, and the across-switches management of business group (Centrex group) subscriber attribute data etc. can be realized. Next, the flows for realizing the above management method will be introduced respectively.

Figure 3:
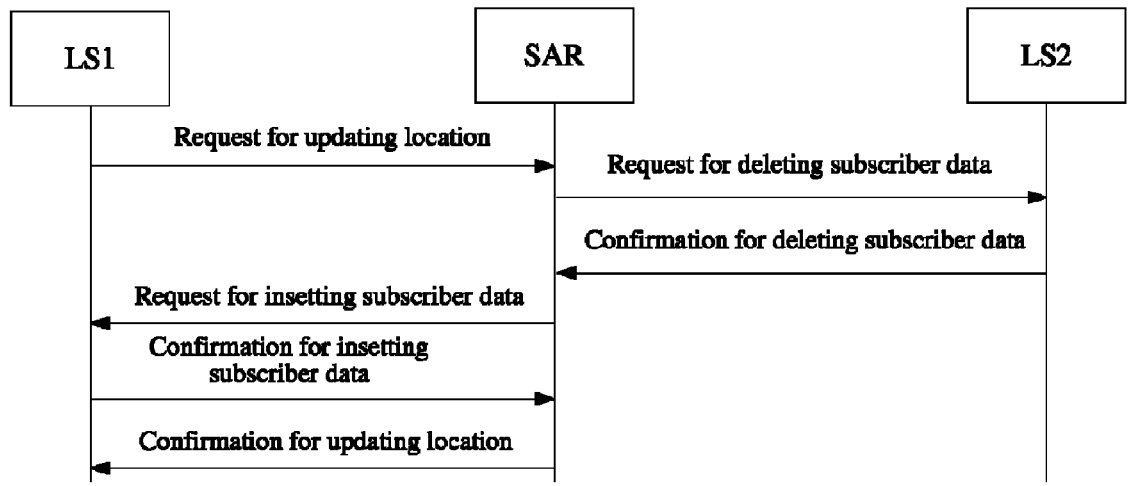
FIG. 3 is the flowchart for updating subscriber location in PSTN network according to embodiment of present invention.

FIG. 3 shows the flowchart of updating subscriber location according to this embodiment. When the subscriber moves from switch LS2 to switch LS1, switch LS1 initiates a location update request to SAR; after the authorization of SAR, switch LS2 is notified to delete the subscriber data; after deleting the subscriber data, switch LS2 returns a confirmation message to SAR; SAR notifies switch LS1 to inset data required for supporting subscriber services; LS1 insets the subscriber attribute data, establishes the relationship between the new physical number corresponding to the subscriber line port where the subscriber currently locates and the subscriber logic number, and returns a confirmation message to confirm that the data insetting is accomplished; SAR re-records the subscriber location information, which can be accomplished through two forms according to different types of subscribers: one form is only to store or update the subscriber node information, that is, update the VLR number of switch LS2 where the subscriber formerly locates into the VLR number of the switch LS1; the other form is to store or update the subscriber switching node information and the subscriber physical number information simultaneously; then, SAR sends a conformation message to switch LS1 to confirm that the location update is accomplished. In the above flowchart, the location update request can be either initiated by the subscriber itself, or by the operator upon submitting an application to the operator. When the subscriber moves within one switch, it is unnecessary to notify the SAR, it only needs to move the subscriber attribute data in the switch to the record corresponding to the new subscriber location.

In the above flowchart, when the subscriber location changes, the current switch inserts the subscriber attribute data from SAR via interface, at the same time, the SAR modifies the subscriber location information. Thus, the roaming subscriber can carry its own logic number, and the mobile subscribe attribute data can also be realized without changing the number and the contracted service information. The subscribers roaming to a new location can be provided with the ability of establishing and receiving calls automatically.

Figure 4:
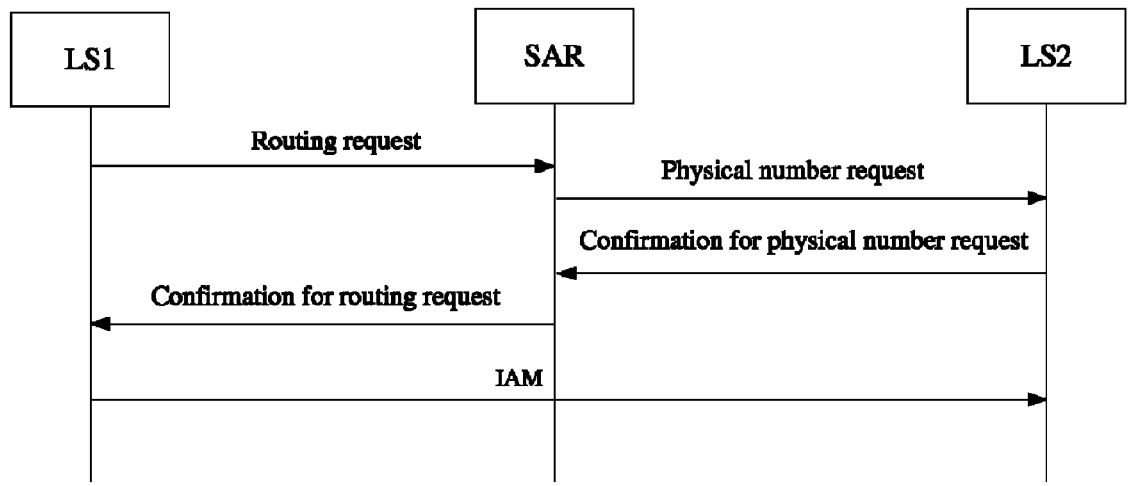
FIG. 4 is the flowchart for routing subscriber call in PSTN network according to embodiment of present invention.

FIG. 4 shows the flowchart of calling route according to the present embodiment. LS1 and LS2 belong to a same SAR. When the subscriber of LS1 initiates a call, the number dialed is the logic number, according to which, the routing information is unable to be obtained, therefore, switch LS1 firstly requests SAR where the called subscriber information is stored for the routing of the called subscriber, with carrying the logic number of the called subscriber; According to the types of the subscriber, SAR either searches and finds the called subscriber in the database directly and returns the physical number to the switch LS1, or finds the switch LS2 where the called subscriber locates in the database, and requests LS2 for the physical number of the called subscriber, and then LS1 analyses the physical number of the called subscriber, and sends IAM message to LS2, the called number carried by the IAM message is the called physical number.

Concerning the above flowchart for the location update and calling, further reference can be made to the Chinese Patent No. 200410030803.8 of this applicant, with the title of "a method for realizing fixed subscriber roaming in PSTN".

The operator is able to manage the subscriber services of every switch or contracted data and number resources collectively by managing SAR with accounting system. When the operator changes the additional service, basic service, contracted data of a subscriber, or modifies closedown service determined by the operator, or the subscriber changes the data related to one or several additional services, it is necessary to exchange information between SAR and the switch of the subscriber, thereby making the subscriber attribute data in the switch be able to synchronize with SAR automatically.

Figure 5:
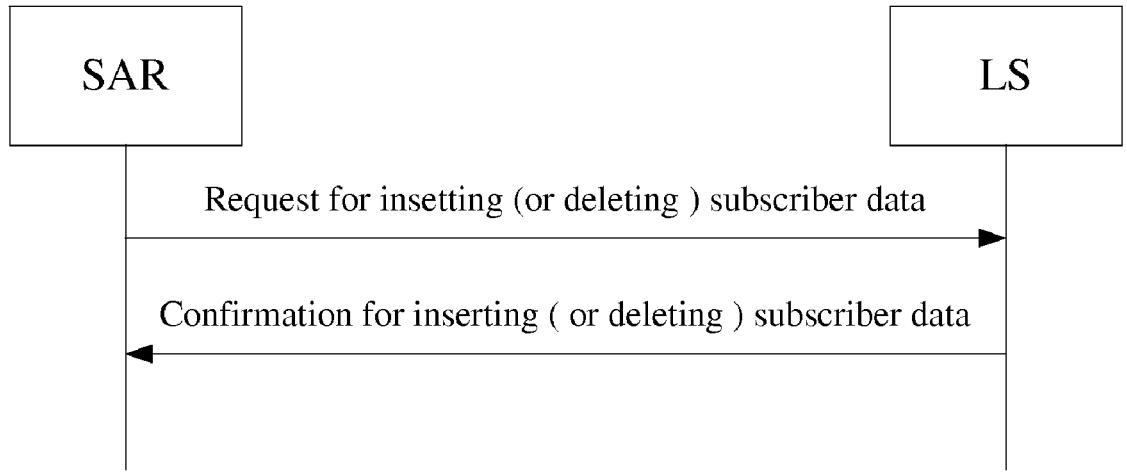
FIG. 5 is the flowchart for SAR insetting (or deleting) subscriber attribute data according to embodiment of present invention.

FIG. 5 shows the flowchart for SAR insetting (or deleting) attribute data of a certain subscriber into (from) the switch. When the subscriber of PSTN asks for a special service, such as modifying contract or modifying certain contract parameters through management means, the data in SAR is modified through accounting system firstly, when SAR updates or restores location, it sends a request for insetting subscriber attribute data to the switch where the subscriber locates, and provides subscriber parameter; the switch then modifies the subscriber data correspondingly, thereafter, returns a confirmation message to SAR. When one or several additional services or basic services of the subscriber are cancelled, SAR notifies the switch to delete the subscriber attribute data, after the switch finishes the deleting operation, it returns a confirmation message.

Figure 6:
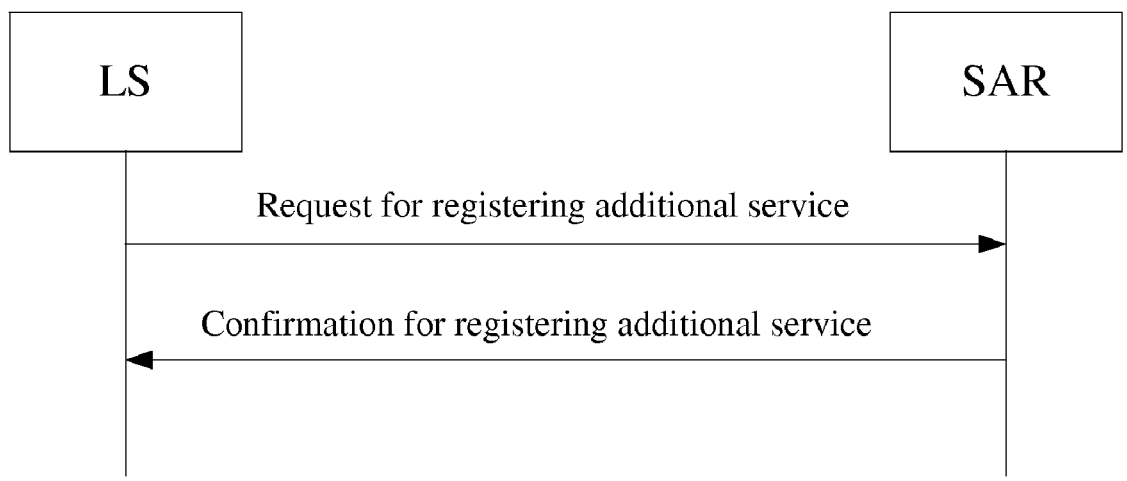
FIG. 6 is the flowchart for PSTN subscriber registering (or deleting) additional service according to embodiment of present invention.

FIG. 6 shows the flowchart for PSTN subscriber registering (or deleting) additional services. The subscriber requires to register (or delete) a certain additional service, such as registering, deleting, activating, or de-activating certain data related to additional services. After receiving operation instruction from the subscriber, switch LS requests SAR to modify the service information of the subscriber, carrying with the data related to the additional services. When SAR accomplishes the modification, it returns a confirmation message, and notifies the switch to re-inset the subscriber data; the switch updates the additional service data of the subscriber in local database, and sends voice prompt to inform the subscriber whether the operation is successful or not. If the subscriber performs a search operation, SAR receives the search request from the switch LS, and searches for the corresponding subscriber attribute information in database, and then notifies the switch to display the result to the subscriber.

Through the interaction between SAR and switch, the present embodiment can also realize the inquiry of the subscriber information and cross-switches management of the subscriber attribute data in business group (Centrex group).

Figure 7:
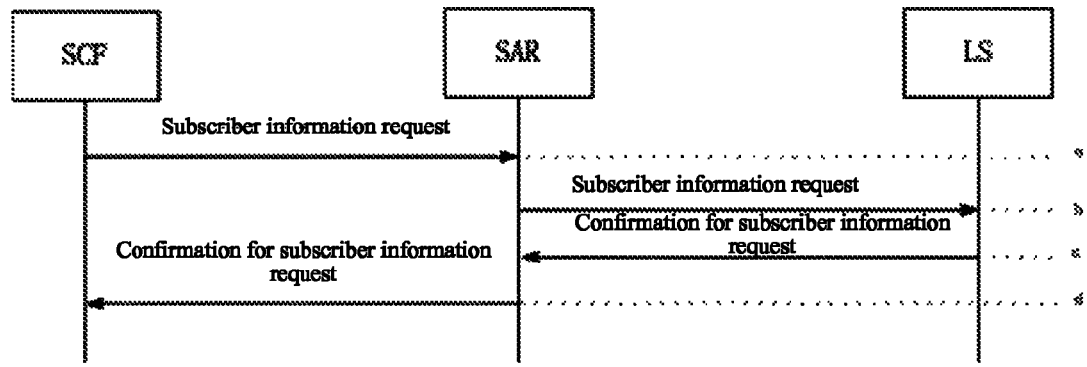
FIG. 7 is the flowchart for SCF requesting subscriber information from SAR according to embodiment of present invention.

The service control function (SCF) module of the switch may request the state and location information of a subscriber at a random time according to service processing requirements. FIG. 7 describes the flowchart of SCF requesting SAR for subscriber information. After the SCF sends a subscriber information request to SAR, SAR firstly sends an inquiry request for the subscriber information to the switch LS where the subscriber locates; the switch LS returns the inquiry result to SAR; then SAR returns the result to the SCF who initiates the inquiry.

Subscribers in Centrex group distribute in multiple switches. In the present embodiment, the traffic service position can modify the subscriber attribute data in the group in SAR through MAP interface, then SAR synchronizes the switch where the subscriber locates by insetting the subscriber attribute data interface, thereby realizing the function of cross-switches management of the subscriber attribute data by the traffic service position.

Figure 8:
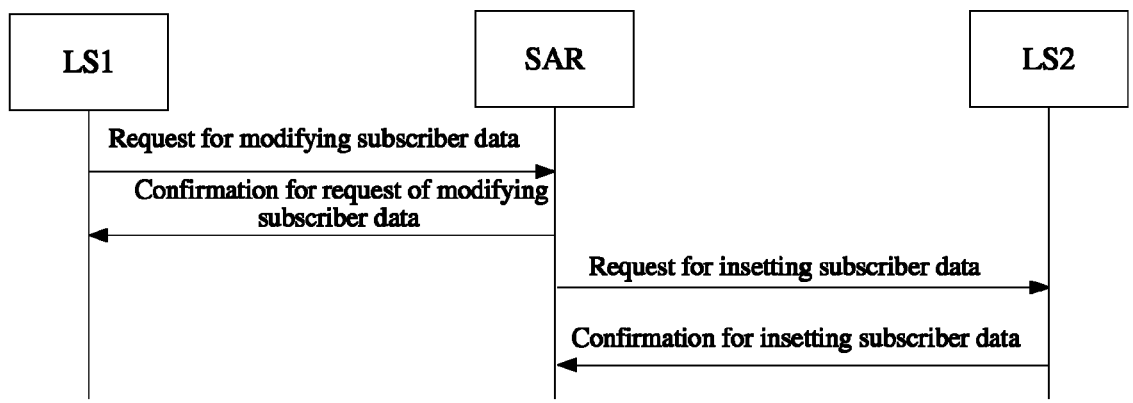
FIG. 8 is the flowchart for traffic service position modifying subscriber attribute data in local Centrex group across offices according to embodiment of present invention.

FIG. 8 is the flowchart for traffic service position managing subscriber attribute data in Centrex group across switches. After the mobilization of switch, the subscriber attribute data is stored or managed by SAR collectively. When the traffic service position located in LS1 needs to modify the subscriber attribute data within Centrex group in LS2, it firstly sends a request for modifying subscriber attribute data to SAR via LS1. SAR judges that the subscriber and the traffic service position belong to a same Centrex group, then SAR modifies the local subscriber attribute data, and returns a confirmation message, and sends a request for insetting the subscriber attribute data to switch LS2 where the subscriber locates. After LS2 finishes the insetting operation, it returns a confirmation message to SAR. Thus, the function of cross-switches management of the subscriber attribute data by the traffic service position is realized.

Figure 9:
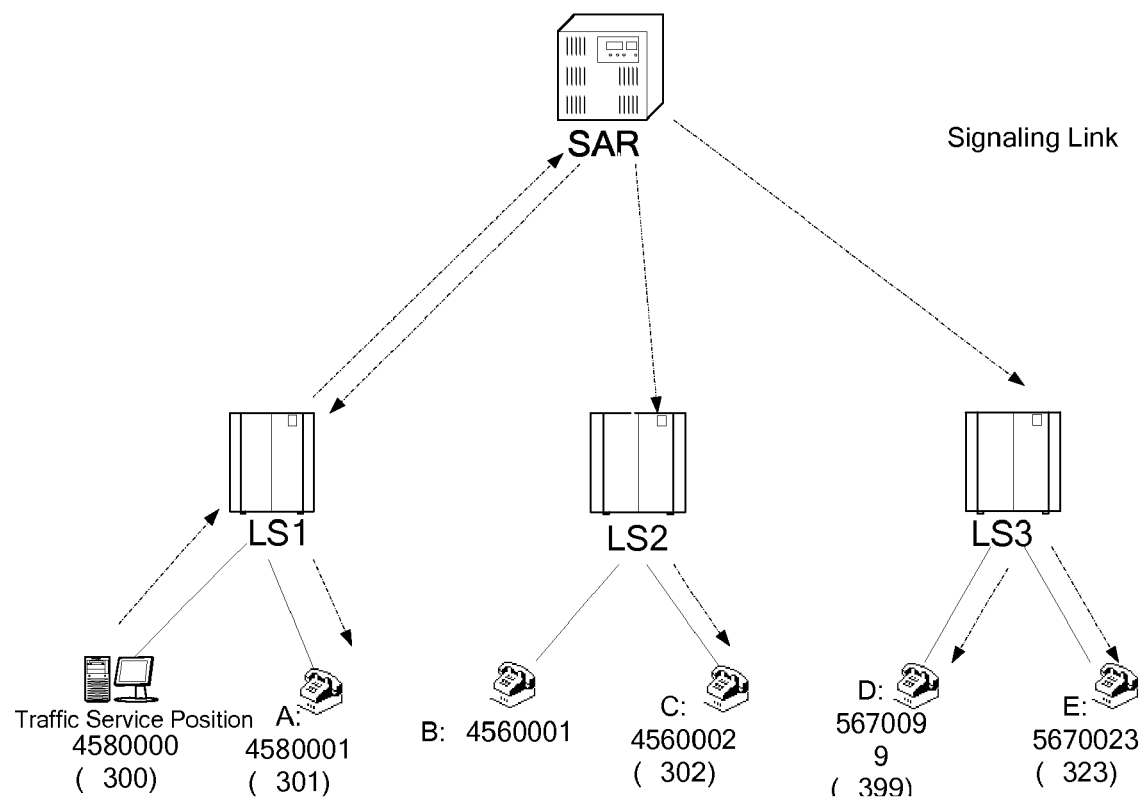
FIG. 9 is the schematic diagram for traffic service position managing subscriber attribute data in Centrex group according to embodiment of present invention.

FIG. 9 is the schematic view for traffic service position managing subscriber attribute data of Centrex group. In FIG. 9, the traffic service position OPR (number is 4580000, short number is 300) and subscriber A (long number is 4580001, short number is 301) are subscribers of switch LS1, subscriber B (long number is 4560001) and subscriber C (long number 4560002, short number is 302) are subscribers of switch LS2, subscriber D (long number is 5670099, short number is 399) and subscriber E (long number is 5670023, short number is 323) are the subscribers of switch LS3, in which, OPR, subscribers A, C, D and E are subscribers in a same Centrex group. The traffic service position modifies the subscriber attribute data of the group in SAR (no matter whether the subscriber and the traffic service position belong to the same switch or belong to different switches), then, SAR automatically synchronize the modified subscriber attribute data to the subscriber switch, thus, the cross-switches management of the subscriber attribute data in group is realized.

When the traffic service position modifies the data of subscriber A in a same switch, it needs to perform the following steps: the traffic service position sending a message to notify the located switch LS1 to modify the data of subscriber A; the switch LS1 converting the message into a form of signaling interface between switch and SAR, notifying the SAR which subscriber A belongs to, with the message carrying the group number of traffic service position and content for modifying the attribute data of subscriber A; SAR judging whether subscriber A and traffic service position belong to a same Centrex group or not, modifying the attribute data of subscriber A according to the message, returning a confirmation message to switch LS1, and insetting the new data of subscriber A into the switch LS1 where subscriber A locates currently.

When traffic service position modifies the data of subscriber C in a different switch LS2, it needs to perform the following steps: the traffic service position sending a message to notify the located switch LS1 to modify the data of subscriber C; the switch LS1 converting the message into a form of signaling interface between switch and SAR, notifying the SAR which subscriber C belongs to, with the message carrying the group number of traffic service position and content for modifying the attribute data of subscriber C; SAR judging whether subscriber C and traffic service position belong to a same Centrex group or not, modifying attribute data of subscriber C according to the message, returning a confirmation message to switch LS1, and insetting the new data of subscriber C into the switch LS2 where subscriber C locates currently.

Similarly, the traffic service position can modify the attribute data of subscribers D and E in LS3, but it can not modify the data of subscriber B in LS2, since the traffic service position and subscriber B do not locate in the same Centrex group. When SAR receives the message that the traffic service position will modify the attribute data of subscriber B, it makes the judgment that the traffic service position and the subscriber B do not belong to the same Centrex group, then it notify LS1 that the modification of subscriber attribute data fails.

Although FIG. 9 describes the situation where the subscribers in the group belong to a same SAR, it is also applicable in the situation that the subscribers within the group belong to multiple SAR, where data synchronization or telecommunication is needed between multiple SAR.

In conclusion, the present invention provides a method and system for realizing mobile management of switch, in which, the management form of mobile service center (MSC)/gateway mobile service switch center (GMSC) in mobile network is introduced into PSTN network, and the subscriber attribute data of PSTN network switch is stored and managed by the subscriber attribute register (SAR) collectively. The switch of PSTN network is similar to the MSC/VLR of mobile network in that the subscriber attribute data stored in local switch database and the subscriber attribute data in SAR are synchronous automatically. The interface between the switch and SAR and the interface between the switch and accounting system can make use of the form used by the mobile network.

Due to the particularity of the fixed network, the method of the present invention has its own features over the mobile network. For example, the location of fixed subscriber is relatively stable, when putting out number, the subscriber data is inset into the switching node where the subscriber locates, only when the subscriber data is not reliable, the switch takes initiative to obtain the subscriber data, and initiates location update; when updating location, the number of the switching node where the subscriber locates and the physical number can be brought to SAR simultaneously, thus, when requesting routing, SAR does not need to request the switching node where the subscriber locates for the physical number, which is convenient and time-saving; at the same time, the subscriber generally corresponds with the physical port one by one, which is relatively fixed, it is different from the mobile network in which any operation needs authorization, thus the authorization process is reduced.

The present invention fully employs the existing network resource of operator, realizing mobile management of switch only by updating limited software and adding SAR (or HLR) equipments. When the mobile management of switch is realized, the subscribers in PSTN are able to enjoy the convenience of movability in a relative fixed condition, meanwhile, the present invention enables the mobile subscribers enjoy voice and data service of high quality in a relative fixed condition, thereby taking full advantages of fixed network, and avoiding the fatal shortcoming of "fixed" of the fixed network terminal.

INDUSTRIAL APPLICABILITY

The present invention enables the fixed network have function of mobile network by re-constructing or updating the structure of fixed network (such as PSTN), and at the same time realizes the collective management of subscriber attribute data, being helpful for collective maintaining, developing new services rapidly, and fully utilizing the number resources.

What we claim is:
1. A method of realizing mobile management of a fixed network switching node, the method comprising the steps of:
  (a) setting a subscriber attribute register in a fixed network, the subscriber attribute register being configured to communicate with a plurality of switching nodes in a service area of the fixed network;
  (b) attributing a unique logic number and a first subscriber physical number corresponding to a port of a subscriber line for a subscriber's access to a switching node, storing the logic number and the first subscriber physical number in a switching node where the subscriber is currently located together with other subscriber attribute data of the subscriber, and storing the subscriber attribute data and subscriber location information on a location of the subscriber in the subscriber attribute register to which the subscriber belongs;
  (c) when the location of the subscriber changes in the fixed network from a first location to a second location, deleting the subscriber attribute data in a record corresponding to the first location, and inserting the subscriber attribute data into a record corresponding to the second location, bundling a second subscriber physical number corresponding to the second location with the logic number, and updating the subscriber location information in the subscriber attribute register; and
  (d) when a call is made to the subscriber, a calling switching node requesting from the subscriber attribute register a called physical number of the called subscriber, the subscriber attribute register searching for and finding the called physical number according to the subscriber location information of the called subscriber and returning the called physical number to the calling switching node, then the calling switching node connecting to the switching node where the called subscriber is currently located according to the called physical number, wherein
  in the step (c), when the subscriber moves across switching nodes,
    the switching node where the subscriber's currently located notifies the subscriber attribute register of the change of the subscriber's location,
    the subscriber attribute register notifies the switching node where the subscriber is previously located to delete the subscriber attribute data after authorization,
    after getting confirmation, the subscriber attribute register notifies the switching node where the subscriber is currently located to insert the subscriber attribute data, and the current switching node bundles the subscriber's new physical number and logic number, and
    the subscriber attribute register updates the subscriber location information after obtaining confirmation from the switching node where the subscriber is currently located.
2. The method of claim 1, wherein
  in the step (b), the subscriber location information is information of the switching node where the subscriber is currently located;
  in the step (c), the subscriber attribute register updates the switching node where the subscriber is currently located into a switching node of the second location; and in the step (d), the subscriber attribute register obtains the called physical number by inquiring the switching node where the called subscriber is currently located.

3. The method of claim 2, wherein every switching node visits a location register number, the subscriber attribute register identifies the location information of the switching node where the subscriber is currently located and searches for an address according the location register number.

4. The method of claim 1, wherein
in the step (b), the subscriber location information includes information of the switching node where the subscriber is currently located and information of the first subscriber physical number;
in the step (c), the subscriber attribute register updates the switching node where the subscriber is currently located and the first subscriber physical number into a switching node of the second location and the second subscriber physical number, respectively; and
in the step (d), the subscriber attribute register searches for the called physical number directly in local.

5. The method of claim 4, wherein every switching node visits a location register number, the subscriber attribute register identifies the location information of the switching node where the subscriber is currently located and searches for an address according to the location register number.

6. The method of claim 1, further comprising the step of
(e) when subscriber service or contract data changes, the subscriber attribute register modifying corresponding subscriber attribute data in a database and notifying the switching node where the subscriber is currently located to insert modified subscriber attribute data, thereby accomplishing synchronous update of data.

7. The method of claim 6, wherein in the step (e),
when an operator changes the subscriber service or contract data, a modification notification is sent out to the subscriber attribute register via an accounting system, and a subscriber parameter is provided; and
when the subscriber modifies additional services, the switching node where the subscriber is currently located sends a modification notification to the subscriber attribute register, carrying data related to the additional services.

8. The method of claim 1, wherein the subscriber attribute register and the switching node communicate with each other via MAP protocol.

9. The method of claim 1, wherein
the logic number includes a telephone number and a regional code of the subscriber used on a Public Switched Telephone Network, and
the physical number employs internal coding of the Public Switched Telephone Network.

10. The method of claim 1, wherein
the subscriber attribute register further stores an international mobile subscriber identification code and a mobile subscriber ISDN number related to the subscriber, in which, the international mobile subscriber identification code includes the subscriber's physical number or logic number, and
the mobile subscriber ISDN number includes the subscriber's logic number and national code as well as regional code.

11. The method of claim 1, wherein in the step (c), when the subscriber moves in the switching node, the subscriber or an operator operates to move the subscriber attribute data from a record of a former location of the subscriber to a record of the current location of the subscriber, and establish a corresponding relationship between the subscriber's logic number and the subscriber's new physical number.

12. The method of claim 1, further comprising the steps of:
a service control functional module of the switching node sending a subscriber information request to the subscriber attribute register; and
after receiving the request, the subscriber attribute register inquiring the switching node where the subscriber is currently located, and returning an inquiry result to the service control functional module that initiated the inquiry.

13. The method of claim 1, further comprising the steps:
when a traffic service portion of the switching node needs to modify the subscriber attribute data within a business group, the traffic service portion first sending out a request for modifying the subscriber attribute data to a home subscriber attribute register via the switching node;
the subscriber attribute register judging whether the subscriber and the traffic service portion belong to the same business group, if so, performing the next steps, otherwise, refusing the request;
the subscriber attribute register modifying local subscriber attribute data, returning a confirmation message, and sending a request of inserting the subscriber attribute data to the switching node where the subscriber is currently located; and
after finishing the inserting operation, the switching node where the subscriber is currently located returning a confirmation message to the subscriber attribute register.

14. A system for realizing mobile management of a fixed network switching node, the system comprising:
multiple switching nodes; and
at least one subscriber attribute register connected with the switching nodes via a signaling link, wherein
each switching node includes:
a database for storing a current physical number corresponding to a port of a subscriber line for a subscriber's access to the switching node, a unique logic number and other subscriber attribute data of the subscriber in a record corresponding to a location of the subscriber;
a communication unit for notifying the subscriber attribute register when the subscriber's location is updated or the subscriber attribute data is modified;
a data process unit for updating attribute data of the subscriber in the database according to a notification of the subscriber attribute register; and
a routing unit for sending out a routing request to a home subscriber attribute register when calling and connecting to the switching node where a called subscriber is currently located according to the physical number of the called subscriber in routing information returned,
the subscriber attribute register includes:
a local database for collectively storing attribute data and location data of all subscribers in a domination area;
a data process unit for modifying location data or subscriber attribute data of a corresponding subscriber in the local database after receiving a notification of location update or data modification from a switching node;
a communication unit for notifying a related switching node to delete or insert the modified subscriber attribute data; and a routing unit for receiving the routing request of a calling switching node, searching for and returning the physical number of the called subscriber to the calling switching node, when the subscriber moves across switching nodes,
the communication unit of the switching node where the subscriber's currently located is configured to notify the subscriber attribute register of the change of the subscriber's location, the subscriber attribute register is configured to
notify the switching node where the subscriber is previously located to delete the subscriber attribute data after authorization, after getting confirmation, notify the switching node where the subscriber is currently located to insert the subscriber attribute data, and update the subscriber location information after obtaining confirmation from the switching node where the subscriber is currently located, and the data process unit of the current switching node is configured to bundle the subscriber's new physical number and logic number.

15. The system of claim 14, wherein both the switching node and the communication unit of the subscriber attribute register have modules which support mobile application part of No. 7 signaling and have corresponding coding/decoding function.

16. The system of claim 14, wherein the subscriber attribute register employs home location register equipment operating on the network.

17. The system of claim 14, wherein
the switching node further includes a service control functional module, for sending subscriber information request to the subscriber attribute register and receiving a result; and the subscriber attribute register further includes an inquiry unit, for sending an inquiry to the switching node where subscriber is currently located after receiving the subscriber information request, and returning the inquiry result to the service control functional module.

18. The system of claim 14, further comprising:
a traffic service portion connected with the switching node for modifying the subscriber attribute data in a located business group, and sending a request of modifying the subscriber attribute data to the subscriber attribute register via the switching node; and the subscriber attribute register further includes a business group process unit, for judging whether the subscriber and the traffic service portion belong to the same business group, if so, modifying the subscriber information in the local database, and notifying the switching node where the subscriber is currently located to insert the new subscriber attribute data via the communication unit, otherwise, refusing the request.

19. The system of claim 14, wherein
the subscriber's logic number in the local database includes a telephone number and a regional code of the subscriber, the physical number employs internal coding of a public switched telephone network; and the subscriber attribute register further stores an international subscriber identification code and a mobile subscriber ISDN number related to the subscriber, the international mobile subscriber identification code includes the subscriber's physical number or logic number, and the mobile subscriber ISDN number includes the subscriber's logic number and national code as well as regional code.

20. A method of realizing mobile management of a fixed network switching node, the method comprising the steps of:
(a) setting a subscriber attribute register in a fixed network, the subscriber attribute register being configured to communicate with a plurality of switching nodes in a service area of the fixed network;

(b) attributing a unique logic number and a first subscriber physical number corresponding to a port of a subscriber line for a subscriber's access to a switching node, storing the logic number and the first subscriber physical number in a switching node where the subscriber is currently located together with other subscriber attribute data of the subscriber, and storing the subscriber attribute data and subscriber location information on a location of the subscriber in the subscriber attribute register to which the subscriber belongs;

(c) when the location of the subscriber changes in the fixed network from a first location to a second location, deleting the subscriber attribute data in a record corresponding to the first location, and inserting the subscriber attribute data into a record corresponding to the second location, bundling a second subscriber physical number corresponding to the second location with the logic number, and updating the subscriber location information in the subscriber attribute register; and (d) when a call is made to the subscriber, a calling switching node requesting from the subscriber attribute register a called physical number of the called subscriber, the subscriber attribute register searching for and finding the called physical number according to the subscriber location information of the called subscriber and returning the called physical number to the calling switching node, then the calling switching node connecting to the switching node where the called subscriber is currently located according to the called physical number, wherein the method further comprises:
when a traffic service portion of the switching node needs to modify the subscriber attribute data within a business group, the traffic service portion first sending out a request for modifying the subscriber attribute data to a home subscriber attribute register via the switching node;

the subscriber attribute register judging whether the subscriber and the traffic service portion belong to the same business group, if so, performing the next steps, otherwise, refusing the request;

the subscriber attribute register modifying local subscriber attribute data, returning a confirmation message, and sending a request of inserting the subscriber attribute data to the switching node where the subscriber is currently located; and after finishing the inserting operation, the switching node where the subscriber is currently located returning a confirmation message to the subscriber attribute register.

* * * * *